United States Patent Office 2,802,034
Patented Aug. 6, 1957

2,802,034

METHOD FOR THE PREPARATION OF PERFLUOROHEPTAN-4-ONE AND ITS HYDRATE

Murray Hauptschein, Philadelphia, Pa., assignor, by mesne assignments, to Pennsalt Chemicals Corporation, a corporation of Pennsylvania No Drawing. Application May 29, 1956,
Serial No. 587,942

9 Claims. (Cl. 260—595)

This invention relates to a method for the preparation of perfluoroheptan-4-one and its hydrate, perfluoroheptane-4,4-diol.

Perfluoroheptan-4-one was first isolated in 1953. In addition to highly stable fluorocarbon groupings, it possesses a reactive center, the carbonyl group which, in contrast to perfluorocarbons, can undergo further chemical transformation. It is therefore useful as an intermediate for a wide variety of new products and in addition is useful per se as a solvent and as a heat transfer medium. Known methods of producing perfluoroheptan-4-one involve the reaction of $C_3F_7MgI$ with $C_3F_7COCl$ or $C_3F_7COOC_2H_5$; or the reaction of $C_3F_7Li$ with $C_3F_7COOC_2H_5$. The highest yield reported with these methods was 31% and they have the disadvantages of requiring reactants, such as $C_3F_7MgI$ and $C_3F_7Li$ which are difficult to prepare and of requiring critical control of the reaction conditions.

Moreover, comparatively little is known about the chemistry of perfluoroheptan-4-one, and although the tendency of perfluorinated ketones to form hydrates has been noted, pure hydrates have not been obtained.

It is an object of the present invention to provide a method for the preparation of perfluoroheptan-4-one which will give higher yields than known processes.

It is another object of the invention to provide a method for the preparation of perfluoroheptan-4-one which may be carried out using commercially available reactants.

A further object of the invention is to provide a method for the preparation of perfluoroheptan-4-one which is convenient, simple and which does not require critical control of the reaction variables.

It is a still further object of the invention to provide a method for the preparation of the hydrate of perfluoroheptan-4-one, namely, perfluoroheptane-4,4-diol.

In accordance with the invention, these and other objects are attained by reacting an alkyl-n-perfluorobutyrate with an alkali metal in elemental form, adding an acid material to the reaction product and working up the reaction mixture to give perfluoroheptan-4-one.

In working up the reaction mixture, various conventional procedures may be used. For example extraction with an organic solvent, e. g. ether, followed by distillation of the rich solvent, may be employed.

Perfluoroheptane-4,4-diol is obtained by reacting perfluoroheptan-4-one with water.

While the mechanism of the reaction is not clearly understood, the perfluoro ketone is not formed until after the reaction mixture is acidified and the initial product is undoubtedly a sodium salt. The following equations indicate the probable course of the reactions.

(1) 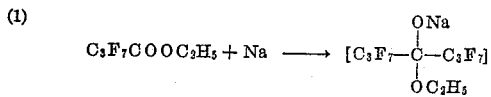

(2) 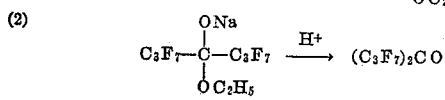

The precise stoichiometry of these reactions has not been ascertained.

The preparation of the diol involves simple addition, viz.

(3) 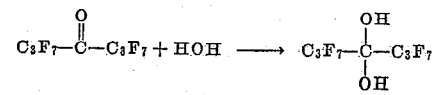

The alkyl butyrates used in the reaction are preferably those having the formula $C_3F_7COOR$ where R is an alkyl radical having not more than about 6 carbon atoms. Examples of suitable alkyl radicals are the methyl, ethyl, propyl and hexyl radicals.

Any alkali metal may be used, for example sodium, potassium, lithium or cesium. Sodium is preferred as being cheaper and more readily obtainable. The sodium may be in various forms such as shot, shavings, dispersions, etc.

The reaction is carried out by first bringing the alkyl perfluorobutyrate into contact with the sodium. Preferably, this is done in the presence of an inert reaction medium, such, for example as ether. When the reaction has gone to completion, excess sodium (if any) is removed, and the product is acidified. Any convenient acid material may be used for this purpose, either a mineral acid, such as sulphuric or hydrochloric acid, or an acid salt such as sodium bisulphate or sodium dihydrogen phosphate. Aqueous solutions of organic acids, for example acetic or halogenated acetic acids, may also be used. However, in general a mineral acid is preferred as simplifying subsequent separation of the product.

The temperature at which the initial phase, i. e. the reaction of butyrate and the alkali metal, is effected has an important effect on the yield of ketone obtained. The reaction may be conducted between about 0° C. and about 100° C.; however above about 60° C., side reactions adversely affect the yield of ketone. Conveniently the reaction is conducted at room temperature or slightly below.

Pressure is not a critical element since the perfluorobutyrates are liquids as is the ketone, and the reaction is essentially a liquid phase reaction. Pressures above atmospheric may be used, but are not advantageous. Pressures down to about 0.1 atmosphere may also be used.

The reaction time is not critical. It is usually on the order of from about 1 to about 24 hours.

The proportion of alkali metal used may vary up to about 2 moles per mole of alkyl perfluorobutyrate. Preferably, approximately equimolar quantities are used. Using less than equimolar quantities decreases the conversion proportionately and using greater quantities encourages side reactions, which cause diminished yields.

In acidifying the initial reaction product, the proportion of acid material used is at least equivalent to the alkali metal used. Preferably, at least enough acid is added to make the final reaction mixture acid. There is no upper limit on the amount of acid material which may be used, but using more than about 10 times the equivalent of the alkali metal serves no useful purpose. When aqueous acids are used, the concentration of the acid is not important but is any convenient concentration which will not bring about excessive dilution. Preferably between about 1 and about 15 N acids will be used.

As pointed out, to produce the diol from the ketone, it is merely necessary to add water to the latter. The amount of water added may be the stoichiometric amount, but is preferably slightly less than this, for example about 99% of the stoichiometric amount. Using more than the stoichiometric amount causes the hydrate, or a portion of it to dissolve in the water.

The invention will be further described with reference to the following specific examples, it being understood that the examples are given for purposes of illustration only and are not to be taken as in any way restricting the invention beyond the scope of the appended claims.

*Example I*

In an atmosphere of dry nitrogen, 109.0 g. (0.45 mole) of ethyl perfluorobutyrate was added over a period of two hours, with stirring, to sodium shot (10.36 g., 0.45 mole) in 150 ml. of anhydrous ether. Reaction was indicated by the immediate change in color to yellow (later dark red). After stirring overnight at room temperature there was no unreacted sodium. The reaction mixture was acidified with 3 N sulphuric acid, the ether layer separated and the aqueous layer exhaustively extracted with ether. The combined ether extracts were dried over anhydrous magnesium sulphate. The ether was removed by distillation and the residue was fractionated in a Podbielniak column. Perfluoroheptan-4-one (49 g., 60%) boiled at 73–76° C. A central cut, B. P. 75° C. was warmed with $P_2O_5$ and gave a molecular weight gas density balance of 364. The molecular weight calculated for $C_7F_{14}O$ is 366. The infra-red spectrum was identical to that for $C_3F_7COC_3F_7$.

*Example II*

The procedure of Example I was carried out in a similar manner except that a sodium dispersion in toluene was used in place of the sodium shot. The product on working up formed a homogeneous azeotrope, B. P. about 80° C., $n_D^{23}=1.3540$, consisting of approximately 80% perfluoroheptan-4-one and 20% by weight of toluene. The azeotrope is useful as a solvent and as a convenient source of ketone.

*Example III*

The procedure of Example I was carried out using 0.3 mole each of ethyl perfluorobutyrate and sodium, except that the reaction was carried out at about 60° C. The product contained approximately 15 grams of perfluoroheptan-4-one and two portions having the following characteristics:

Portion I—13 grams; boiling point 83° C.; $n_D^{26}=1.3030$, C, 30.93%; H, 2.00%.

Portion II—7.5 grams; boiling point 147° C.; $n_D^{28}=1.3252$; C, 31.76%; H, 2.96%.

Portion I contained some perfluoroheptan-4-one. Portion II reduced cupric acetate.

*Example IV*

The procedure of Example I was carried out using equimolar quantities of sodium and methyl perfluorobutyrate. Perfluoroheptan-4-one was obtained in about 50% yield.

*Example V*

The procedure of Example I was carried out using 72 g. (0.3 mole) ethyl perfluorobutyrate and 6.9 g. (0.3 mole) sodium shot, and using 200 ml. of n-butyl ether as the reaction medium. The reaction was allowed to continue for one day. During the reaction, a color change from colorless to a dark brown was observed. Ten grams of perfluoroheptan-4-one were isolated.

*Example VI*

To a 1 g. sample of pure perfluoroheptan-4-one (B. P. 75°) a slight deficiency of water was added. The product was evacuated at 0.1 mm. A white crystalline solid, M. P. 35–35.5°, $n_D^{20}=1.293$ (for super-cooled sample), remained. The solid is $C_3F_7C(OH)_2C_3F_7$.

Analysis: Calculated for $C_7H_2F_{14}O_2$; C, 21.88; H, 0.52. Found: C, 21.70; H, 0.57.

The dihydroxy structure for the ketone hydrate was further confirmed by examination of its infra-red spectrum. It has a broad band around $3.0\mu$ which is attributed to the associated hydroxyl group. The carbonyl band at $5.6\mu$ was only very slight, while in the ketone spectrum there is an intense carbonyl band at $5.6\mu$. Probably this small carbonyl band would disappear entirely at temperatures considerably below 30° C., at which temperature the above values were obtained. At lower temperatures, the equilibrium would be displaced entirely toward the hydrate.

The hydrate is useful in making tertiary amine adducts which have useful surface active properties, as brought out in the copending application of Hautpschein and Braun, Serial No. 586,902, filed May 24, 1956. Thus perfluorobutane-4,4-diol can be reacted with an excess of an anhydrous tertiary amine, such as, for example, triethylamine to form an adduct having the formula $$C_3F_7C(OH)_2C_3F_7.N(C_2H_5)_3$$

which is a useful surface active material and may be employed, for example, as a coolant additive to aid in scouring undesirable deposits from cooling systems.

From a consideration of the foregoing specification, it will be seen that the invention provides a simple and economical means of making perfluoroheptan-4-one and its hydrate in high yields. Standard, commercially available reagents alone are used.

What is claimed is:

1. A method for making perfluoroheptan-4-one which comprises reacting a compound having the general formula $$CF_3CF_2CF_2COOR$$

where R is an alkyl radical having not more than 6 carbon atoms with an alkali metal at a temperature between about 0 and about 100° C. and acidifying the reaction product.

2. The method claimed in claim 1 wherein the alkali metal is sodium.

3. The method claimed in claim 1 wherein R is the methyl radical.

4. The method claimed in claim 1 wherein R is the ethyl radical.

5. The method claimed in claim 1 wherein the reaction between the compound $$CF_3CF_2CF_2COOR$$

and the alkali metal is conducted in the presence of an inert reaction medium.

6. The method claimed in claim 1 wherein the reaction between the compound $$CF_3CF_2CF_2COOR$$

and the alkali metal is conducted in the presence of a liquid dialkyl ether.

7. The method claimed in claim 6 wherein the ether is diethyl ether.

8. A method for making perfluoroheptane-4,4-diol which comprises reacting a compound having the general formula $$F_3C-CF_2-CF_2COOR$$

where R is an alkyl radical having not more than 6 carbon atoms with metallic sodium, acidifying the reaction mixture to form perfluoroheptan-4-one and reacting the last-named compound with water.

9. Perfluoroheptane-4,4-diol.

References Cited in the file of this patent

UNITED STATES PATENTS 2,568,500    Husted et al. _____ Sept. 18, 1951